July 2, 1968  HARU ITO  3,391,324

SYNCHRONOUS RECTIFYING CIRCUIT

Filed Nov. 4, 1966

INVENTOR.
HARUO ITO
BY
Q. C. Smith
ATTORNEY 3,391,324
SYNCHRONOUS RECTIFYING CIRCUIT
Haruo Ito, Loveland, Colo., assignor to Yokogawa-Hewlett-Packard, Ltd., Tokyo, Japan, a corporation of Japan
Filed Nov. 4, 1966, Ser. No. 592,126
Claims priority, application Japan, Nov. 15, 1965, 40/70,065
2 Claims. (Cl. 321—8)

This invention relates to a synchronous rectifying circuit which generates a rectified output proportional to the magnitude of an AC input for values thereof smaller than a selected magnitude, and which generates a saturated output for AC inputs having values greater than the selected magnitude where the selected magnitude of the AC input at which when the rectified output saturates may be set at any value within a certain range.

In an automatic balancing control system such as in an automatic balancing bridge, a circuit is required which is comparatively less sensitive to high level signals and which is highly sensitive to low level signals near the balancing point.

Accordingly, it is the object of this invention to provide a synchronous rectifying circuit for use in an automatic control system which provides a linear output on low level input signals and which provides a compressed or saturated output on high level input signals.

Other and incidental objects of the present invention will be apparent from a reading of this specification and an inspection of the accompanying drawing in which.

Figure 1:
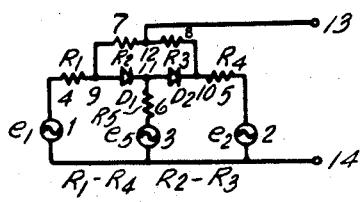
FIGURE 1 is the connection diagram of one embodiment of this invention.
Figure 2:
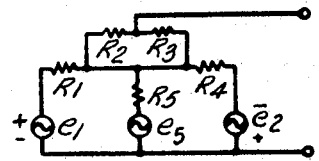
FIGURES 2, 3 and 4 are equivalent circuit diagrams for describing the operation of the illustrated embodiment of this invention.
Figure 5:
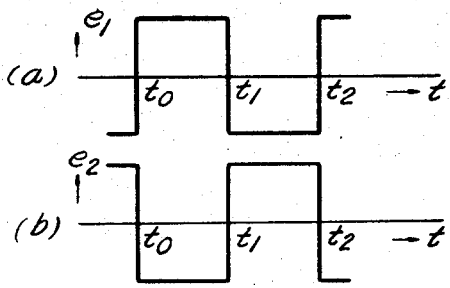
FIGURE 5 is a graph showing the wave forms present in the circuit of FIGURE 1.
Figure 5:
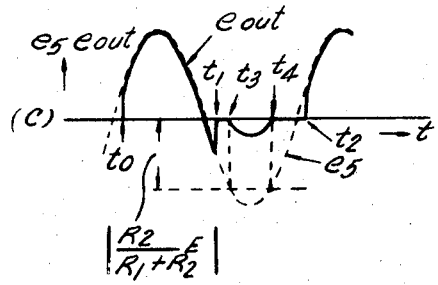

In FIGURE 1, 1 and 2 are reference voltage sources which generate alternating voltages of equal magnitude and opposite phase. These alternating voltages $e_1$ and $e_2$ are shown in FIGURE 5 as alternating square waves of amplitude E but it should be understood that alternating signals having other waveforms may also be used. Signal source 3 provides an AC input signal having an instaneous value indicated by $e_S$. Resistor 6 represents the internal resistance of signal source 3 and has a magnitude indicated by $R_5$. Resistors 4 and 5 of equal resistance values and resistors 7 and 8 of equal resistance values are serially connected between the alternating signal sources 1 and 2 and semiconductor diodes $D_1$ and $D_2$ are serially connected between the common connections 9 and 10 of the resistors with the input signal source and its equivalent resistance connected to the common connection of diodes $D_1$ and $D_2$. An output terminal 13 is provided at the common connection 12 of resistors 7 and 8. In operation, consider that $e_1$ is positive and $e_2$ is negative, then the equivalent circuit is shown in FIGURE 2 since the semiconductor diodes $D_1$ and $D_2$ are in conductive condition. The absolute value E of the combined standard voltages $e_1$ and $e_2$ is greater than $e_S$ of source 3 so that the diodes $D_1$ and $D_2$ remain conductive. Consequently, input voltage $e_S$ passes resistors 7 and 8, and appears at the output terminal 13 with respect to the common connection terminal 14 of sources 1, 2 and 3. Next, consider the case $e_1$ is negative and $e_2$ is positive, then diodes $D_1$ and $D_2$ will be in non-conductive state, the current from standard sources 1 and 2 flows through resistors 5, 8, 7 and 4 in the direction of the order named and the magnitude of the voltage appearing across the series circuit of diodes $D_1$ and $D_2$ in the reverse conduction direction will be equal to the voltage drop which occurs across the series circuit of resistors 7 and 8. Assuming that E is the absolute value of $e_1$ and $e_2$, this voltage is:

$$\frac{R_2+R_3}{R_1+R_2+R_3+R_4} \times 2E = \frac{R_2}{R_1+R_2}$$

Consequently, when the reverse leakage characteristics of diodes $D_1$ and $D_2$ are equal, the magnitude of the reverse voltage applied to one diode will be $$\frac{R_2}{R_1+R_2}E$$

Figure 3:
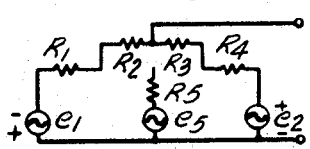

Thus, as long as the magnitude of $e_S$ is smaller than $$\frac{R_2}{R_1+R_2}$$

the reverse voltage appearing across each of the diodes, these diodes remain in the non-conductive state and the equivalent of the circuit is shown in FIGURE 3. Consequently, as the circuits of FIGURES 2 and 3 alternate in operation as a synchronous rectifying circuit, the magnitude of the rectified output that occurs at output terminals 13 and 14 will be proportional to the magnitude of the AC input.

Figure 4:
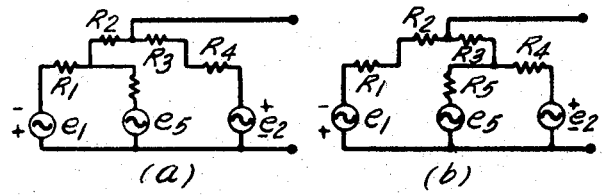

As the magnitude of $e_S$ increases to a value greater than $$\frac{R_2}{R_1+R_2}E$$

then when $e_S$ is negative, $D_1$ will be in the conductive state, and when it is positive, $D_2$ will be in the conductive state, and FIGURES 4(a) and (b) become the equivalent circuits during alternating half cycles of operation, so that a portion of $e_S$ will appear at the output terminal. FIGURE 5 indicates the waveforms of signals present in this circuit for input signal $e_S$ and reference signals $e_1$ and $e_2$. FIGURES 5(a) and (b) are the waveforms of $e_1$ and $e_2$, the dotted line graph of (c) is the waveform of $e_S$, and the solid line graph of (c) indicates the output wave $e_{out}$. During the time interval between $t_0$ and $t_1$, $e_1$ is positive, $e_2$ is negative, and the waveform of $e_S$ appears unchanged at the output. During the time interval between $t_1$ and $t_2$, $e_1$ is negative, $e_2$ is positive, and during the time interval between $t_3$ and $t_4$, $D_1$ will be conductive as the magnitude of $e_S$ becomes greater than $$\frac{R_2}{R_1+R_3}E$$

so the negative portion of the waveform of $e_S$ will appear at the output. Consequently, the mean value of this output wave is reduced thereby, and becomes the saturation characteristic.

I claim:
1. A synchronous rectifying circuit comprising:
first and second reference sources for producing signals in opposite phase relationship;
a first series circuit including first and second diodes, a first resistor connecting one end terminal of said first series to the first reference source;
a second resistor connecting the remaining end terminal of said first series circuit to the second reference source;
a second series circuit including third and fourth resistors connected between the end terminals of said first series circuit;
an input terminal connected to the common connection of the first and second diodes for applying an input signal thereto; and
an output terminal connected to the common connection of said third and fourth resistors.

2. A synchronous rectifying circuit as in claim 1 wherein:
   said first and second diodes are poled in said first-series circuit to conduct current in the same direction and the first and second reference sources produce alternating signals of equal amplitude which have selected magnitudes relative to the magnitude of a signal applied to said input terminal.

References Cited

FOREIGN PATENTS 929,532   7/1947   France.

LEE T. HIX, *Primary Examiner.*

W. M. SHOOP, *Assistant Examiner.*